(12) United States Patent
Froggatt

(10) Patent No.: US 6,566,648 B1
(45) Date of Patent: *May 20, 2003

(54) EDGE TRIGGERED APPARATUS AND METHOD FOR MEASURING STRAIN IN BRAGG GRATINGS

(75) Inventor: Mark E. Froggatt, Yorktown, VA (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/535,661

(22) Filed: Mar. 24, 2000

Related U.S. Application Data

(60) Provisional application No. 60/127,605, filed on Mar. 25, 1999.

(51) Int. Cl.[7] .............................. G01J 1/04; G01J 1/42; G01J 5/08
(52) U.S. Cl. ............................ 250/227.14; 250/227.19; 356/35.5
(58) Field of Search ....................... 250/227.14, 227.19, 250/227.17; 340/555, 556, 557; 356/32, 33, 34, 35, 35.5

(56) References Cited

U.S. PATENT DOCUMENTS 5,798,521 A * 8/1998 Froggatt ................ 250/227.19

OTHER PUBLICATIONS

M. Froggate et al., "Distributed measurement of static strain in an optaical fiber with multiple Bragg gratings at nominally equal wavelengths", *Applied Optics*, vol. 37, No. 10, Apr. 1, 1998, pp. 1741–1746.

M. Froggatt et al., "High–spatial–resolution distributed strain measurement in optical fiber with Rayleight scatter", *Applied Optics*, vol. 37, No. 10, Apr., 1998, pp. 1735–1740.

* cited by examiner

Primary Examiner—Robert H. Kim
Assistant Examiner—Courtney Thomas
(74) Attorney, Agent, or Firm—Robin W. Edwards

(57) ABSTRACT

An apparatus and method for measuring strain of gratings written into an optical fiber. Optical radiation is transmitted over one or more contiguous predetermined wavelength ranges into a reference optical fiber network and an optical fiber network under test to produce a plurality of reference interference fringes and measurement interference fringes, respectively. The reference and measurement fringes are detected, and the reference fringes trigger the sampling of the measurement fringes. This results in the measurement fringes being sampled at $2\pi$ increments of the reference fringes. Each sampled measurement fringe of each wavelength sweep is transformed into a spatial domain waveform. The spatial domain waveforms are summed to form a summation spatial domain waveform that is used to determine location of each grating with respect to a reference reflector. A portion of each spatial domain waveform that corresponds to a particular grating is determined and transformed into a corresponding frequency spectrum representation. The strain on the grating at each wavelength of optical radiation is determined by determining the difference between the current wavelength and an earlier, zero-strain wavelength measurement.

20 Claims, 2 Drawing Sheets

EDGE TRIGGERED APPARATUS AND METHOD FOR MEASURING STRAIN IN BRAGG GRATINGS

CLAIM OF BENEFIT OF PROVISIONAL APPLICATION

Pursuant to 35 U.S.C. Section 119, the benefit of priority from provisional application No. 60/127,605, with a filing date of Mar. 25, 1999, is claimed for this non-provisional application.

ORIGIN OF THE INVENTION

The invention described herein was made by an employee of the United States Government and may be used by or for the Government for governmental purposes without the payment of any royalties thereon or therefor.

BACKGROUND OF THE INVENTION

1. Field of the Invention

The present invention is generally related to an edge triggered apparatus and method for measuring the strain of Bragg gratings written into an optical fiber.

2. Problem to be Solved

It is often desirable to measure optical fibers for strains that occur when the optical fibers are stressed. Such stress can occur if the optical fiber is subject to physical forces that stretch, contort or contract the optical fiber. Stress to the optical fibers can also occur as a result of variations in temperature of the environment within which the optical fiber is located. Such physical forces and temperature variation are typically found in aerospace environments such as aircraft or spacecraft.

Fiber Bragg Gratings have been used to sense strain in optical fibers. Fiber Bragg Gratings comprise a portion of the optical fiber where the index of refraction has been changed. The gratings are written on a section of the optical fiber which is then bonded to longer lead-in, lead-out optical fibers. Coherent light of a specific wavelength is transmitted down the core of the optical fiber. The coherent light reflects off the Bragg Gratings of the same wavelength and passes back up the fiber. As the grating spacing changes in response to strain, the index of refraction of the grating changes thereby altering the period of the modulation of the index of refraction. Multiple Fiber Bragg Grating configurations can also be used for measuring strain. In such a configuration, each Bragg grating has a unique central frequency (and no overlap of the frequency response). Thus, multiplexed signals can be transmitted by the optical fiber and discriminated by the Fiber Bragg Gratings. Conventional systems and methods of interrogating Bragg gratings involve the determination of the center frequency of the grating. These methods typically discard the information available from the entire spectral response of the Bragg grating. Thus, these conventional systems and methods measure only the point strain in an optical fiber.

U.S. Pat. No. 5,798,521 discloses and claims a system and method for measuring the strain at each point in the Bragg grating. In that system, optical radiation is transmitted over one or more contiguous predetermined wavelength ranges into a reference optical fiber network and an optical fiber network under test to produce a plurality of reference interference fringes and measurement interference fringes, respectively. The fringes from the reference cavity are digitized in the same manner as the measurement fringes. After being digitized, a computer algorithm is used to determine the phase of the signal at every point in the data set and, from this phase, the change in wavelength of the tunable laser is determined. A simplified approach to that disclosed and claimed in U.S. Pat. No. 5,798,521 for correcting for nonlinearities in the laser wavelength sweep is desired.

It is therefore an object of the present invention to provide a new and improved apparatus and method for measuring the modulation of the index of refraction of a Bragg grating.

It is another object of the present invention to provide a new and improved apparatus and method for measuring the strain at every point along a Bragg grating.

It is a further object of the present invention to provide a new and improved apparatus and method for measuring the strain at every point along a Bragg grating with a relatively high degree of accuracy.

It is another object of the present invention to provide a new and improved apparatus and method for measuring the strain at every point along a Bragg grating that may be implemented cost effectively.

It is yet another object of the present invention to provide a new and improved apparatus and method for measuring the strain at every point along a Bragg grating that corrects for nonlinearities in the laser wavelength sweep with greater computational efficiency.

It is yet another object of the present invention to provide a new and improves apparatus and method for measuring the strain at every point along a Bragg grating that uses fringes from a reference cavity to trigger the sampling of measurement fringes.

Still other objects and advantages of the present invention will in part be obvious and will in part be apparent from the specification.

SUMMARY OF THE INVENTION

The above and other objects and advantages, which will be apparent to one of skill in the art, are achieved in the present invention which is directed to an apparatus and method for measuring the complete spectral response of Fiber Bragg Gratings so that the strain at each point in the grating can be measured. In accordance with the present invention, optical radiation is transmitted over one or more contiguous predetermined wavelength ranges into a reference optical fiber and an optical fiber under test to produce reference and measurement interference fringes. The optical fiber under test has a plurality of gratings written therein. The reference and measurement fringes are detected, and the reference fringes trigger the sampling of the measurement fringes. This results in the measurement fringes being sampled at $2\pi$ increments of the reference fringes. Each sampled measurement interference fringe is transformed into a spatial domain waveform such that each spatial domain waveform corresponds to one of the contiguous predetermined wavelength ranges. The spatial domain waveforms are then summed to form a summation spatial domain waveform. The summation spatial domain waveform is then analyzed to determine the location of each grating with respect to a reflector of the optical fiber under test. The next step entails determining from each spatial waveform a portion of the spatial domain waveform that corresponds to a particular grating. Each of these determined portions of the spatial domain waveforms is transformed into a corresponding frequency spectrum representation. The strain on the grating at each wavelength of optical radiation is then determined by determining the difference between the current wavelength and an earlier, zero-strain wavelength measurement.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 2:
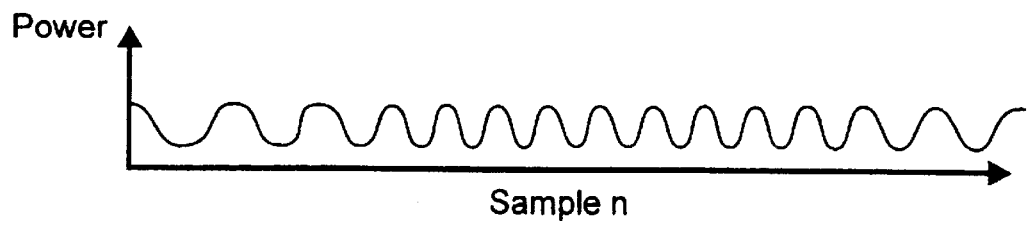
FIG. 2 illustrates a reference fringe waveform at the input of a detector shown in the apparatus of FIG. 1.
Figure 3:
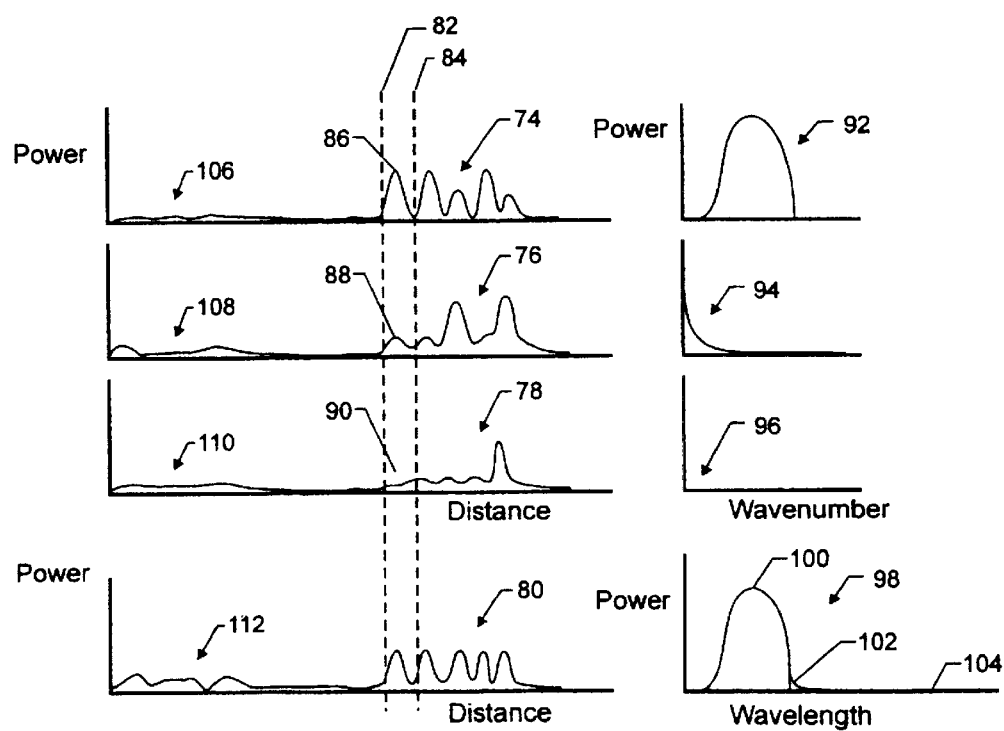
FIG. 3 is a graph illustrating the spatial domain and the frequency domain characteristics of gratings as the wavelength of a coherent light source, shown in FIG. 1, is varied over a predetermined wavelength range.

In describing the preferred embodiments of the present invention, reference will be made herein to FIGS. 1–3 of the drawings in which like numerals refer to like features of the invention.

As discussed above, conventional systems and methods of interrogating Bragg gratings involve the determination of the center frequency of the grating. These conventional methods do not utilize the information available from the entire spectral response of the Bragg grating. Contrary to these conventional methods, the apparatus and method of the present invention measures the entire spectral response of the in-fiber Bragg grating. By measuring the complete spectral response of the Bragg grating, the strain at each point in the grating can be measured. Therefore, longer (and fewer) gratings could be used to cover the same fiber length. Furthermore, the fringes from the reference cavity are used to trigger the sampling of the measurement fringes, resulting in the measurement fringes being sampled at $2\pi$ increments of the reference fringes.

Figure 1:
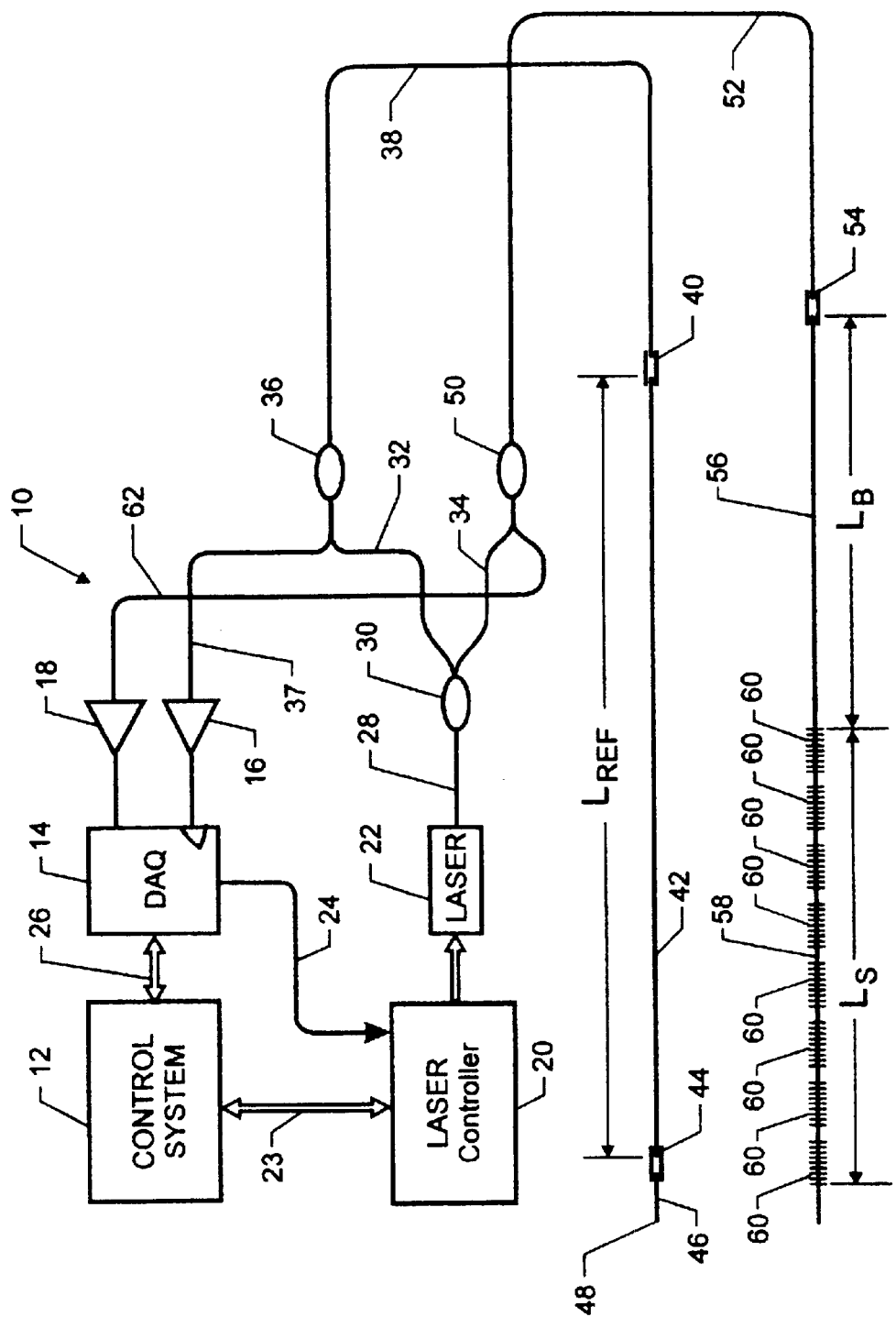
FIG. 1 is a block diagram of the strain measurement apparatus of the present invention.

Referring to FIG. 1, apparatus 10 of the present invention generally comprises control system 12, data acquisition (DAQ) circuit 14, detectors 16 and 18, laser controller 20, and coherent light source or tunable laser 22.

Control system 12 performs several functions including receiving and analyzing digital data outputted by DAQ circuit 14 and outputting control signals to laser controller 20. Control system 12 outputs control signals over data bus 23 for input to laser controller 20. Control system 12 may be implemented by a microprocessor or computer having a random access memory (RAM). The RAM should be large enough to perform signal processing algorithms such as Fourier Transform analysis. Control system 12 may be implemented by any one of the many commercially available personal computers such as the Power Macintosh 8100 manufactured by Apple Computer Inc. of Cupertino, Calif. It is highly preferable that the RAM have a size of at least 40 megabytes. In a preferred embodiment, the functions of control system 12 are implemented by a software program that provides built-in hardware interfaces, displays and signal processing algorithms. In a most preferred embodiment, the software program is configured with a programming language such as LabView™. LabView™ provides built-in hardware interfaces, displays and signal processing algorithms that significantly reduce the total amount of programming actually required.

Laser controller 20 is a commercially available external cavity tunable laser controller and includes a piezoelectric tuning (PZT) system. Laser controller 20 comprises circuitry to provide the drive current, temperature stabilization, picomotor tuning and drive voltage for the PZT system. Positioning the picomotor is accomplished through commands outputted by control system 12 over data bus 23. These commands are inputted into a data input port of laser controller 20. The PZT system receives an analog control voltage 24 from DAQ circuit 14 and tunes laser 22 to a specific wavelength. The actual wavelength depends upon the magnitude of the analog control voltage 24. The PZT tunes laser 22 over a predetermined range of wavelengths in response to a corresponding range of analog control voltages.

Laser controller 20 may be realized by a commercially available laser controller. In a most preferred embodiment, laser controller 20 has operational characteristics similar to the New Focus 6200 External Cavity Tunable Laser Controller, manufactured by New Focus of Santa Clara, Calif. The New Focus 6200 Controller has a GPIB port for receiving data from data bus 23. The New Focus 6200 Controller also includes a PZT system that is able to tune laser 22 over the range of 0.29 nm (nanometer). The operation of laser controller 20 will be discussed below in detail.

In a preferred embodiment, laser 22 is an external cavity laser which is tuned by changing the angle of a Bragg grating within the cavity and is tunable over a predetermined bandwidth. Laser 22 may be realized by a commercially available tunable laser. In a most preferred embodiment, laser 22 has operational characteristics similar to the New Focus 6213 Laser. The New Focus 6213 Laser is tunable over its 1310 nm gain bandwidth, has a linewidth of about 100 KHz and output power of about 1 mW (milliwatt). The operation of laser 22 will be discussed below.

Detectors 16 and 18 are optical receivers. Each detector is configured to detect and convert the power or intensity of interference fringes at the detector's input into a voltage. In a preferred embodiment, each detector 16 and 18 has operational characteristics similar to the commercially available New Focus 2011 Front End Optical Receiver.

DAQ circuit 14 comprises an analog-to-digital converter (ADC) and a digital-to-analog converter (DAC). Data bus 26 transfers data between DAQ circuit 14 and control system 12. The ADC circuit converts the outputs of detectors 16 and 18 into a pair of multi-bit signals. Since high resolution is desired, it is highly preferable if each multi-bit signal comprises at least has sixteen (16) bits. The analog-to-digital conversions are made at a predetermined conversion rate. Preferably, the conversion rate is between about 10 kHz and 20 kHz. The DAC within DAQ circuit 14 receives a multi-bit signal over data bus 26 from control system 12 and converts the multi-bit signal into analog control voltage 24. In order to achieve high resolution, the multi-bit signal input into the DAC circuit is comprised of at least twelve (12) bits. As discussed above, analog control voltage 24 controls the tuning of the PZT system of controller 20. DAQ circuit 14 may be realized by a commercially available data acquisition card. In a preferred embodiment, DAQ circuit 14 has operational characteristics similar to the commercially available National Instruments NB-MIO-16XH-42 Data Acquisition and Control Card manufactured by National Instruments of Austin, Tex. The NB-MIO-16XH-42 can convert analog signals on two (2) channels at a 12 KHz rate to a pair of sixteen (16) bit signals.

Referring to FIG. 1, laser 22 transmits optical radiation or lightwaves through optical fiber 28 and into coupler 30.

Coupler 30 is a 2/1 fiber optic coupler that divides the light such that half the light passes through optical fiber 32 and the other half passes through optical fiber 34. The light in optical fiber 32 passes through fiber optic coupler 36 and optical fiber 38. Air gap reflector 40 is located in the end of optical fiber 38. In a preferred embodiment, air gap reflector 40 is formed by two (2) cleaved ends of fibers in a NorlandJ Splice Tube. Air gap reflector 40 produces a minimal reflection, typically about 7%. Optical fiber 42 extends from the exit of reflector 40. Optical fiber 42 has a predetermined length and is referred to herein as reference length $L_{REF}$. The transmitted light continues down optical fiber 42 until it encounters air-gap reflector 44 located at the end of optical fiber 42. Air gap reflector 44 is constructed in a manner similar to air-gap reflector 40. Optical fiber 46 extends from the exit of air-gap reflector 44. End 48 of optical fiber 46 is shattered so that no light is reflected back down optical fiber 42. The light reflected from air gap reflector 40 passes through coupler 36. Similarly, the light reflected from air-gap reflector 44 passes through coupler 36. The light reflected from reflector 40 interferes with the light reflected from reflector 44 and produces a fringe or interference fringe (also known as an interference fringe pattern). As used herein, the terms fringe or interference fringe are defined as the change from high to low intensity when the interference shifts from a constructive interference to a destructive interference. The interference fringe is inputted into detector 16 via optical fiber 37. This interference fringe is referred to herein as a "reference interference fringe". Detector 16 detects the intensity of the interference fringe. The intensity is the power of the resulting interference fringe. Detector 16 converts the intensity (or power) into current which is then converted into a voltage. The voltage is inputted into an electronic comparator internal to DAQ 14 which generates a "reference trigger signal". Optical fibers 38, 42 and reflectors 40, 44 form a "reference cavity".

The other half of the light emanating from tunable laser 22 passes through coupler 30, optical fiber 34 and optical coupler 50. The light exiting optical coupler 50 travels down optical fiber 52. The length of optical fiber 52 can be any length, possibly even kilometers long. It is highly preferable that optical fiber 52 contain no reflections. Air gap reflector 54 is located at the end of optical fiber 52 and is formed in a manner similar to air gap reflectors 40 and 44 discussed above. Air gap reflector 54 is referred to as a reference reflector. Optical fiber 56 extends from the exit of air gap reflector 40 and is referred to as a "buffer section". Optical fiber 56 has a predetermined length referred to as buffer length $L_B$. It is highly preferable that optical fiber 56 (or buffer section) contain no reflections. Optical fiber section 58 is a "sensing section" and has a plurality of Bragg gratings 60 written thereon. In a preferred embodiment, optical fiber section 58 has a length $L_S$ that is substantially equal to $L_B$.

The light that is not reflected by the reference reflector 54 travels through optical fiber 56 (or buffer section) and, if it has the proper wavelength, is reflected by one or more of the Bragg gratings 60. The end of optical fiber 58 (the sensing section) is preferably shattered so that no light is reflected. The light reflected from Bragg gratings 60 and the light reflected from reference air gap reflector 54 return through optical fiber 52 and passes through optical coupler 50. The output of optical coupler 50 is coupled to optical fiber 62 which passes the light into detector 18. The light reflected from Bragg gratings 60 interferes with the light reflected from reference air gap reflector 54 thereby producing an interference fringe. This fringe is referred to herein as the "measurement interference fringe". The total intensity of this measurement interference fringe depends upon the phase amplitude of the lightwaves reflected from reflector 54 and Bragg gratings 60. If the wavelength of optical fiber 58 changes due to strain, the amplitude and phase of the lightwave reflected from gratings 60 will also change thereby resulting variations in the power of the interference fringe at the input to detector 18.

Detector 18 converts the power (or intensity) of this interference fringe into a voltage level. The ADC of DAQ circuit 14 converts this voltage into a multi-bit signal. As discussed above, this multi-bit signal preferably comprises 16 (sixteen) bits. The multi-bit signal is inputted into control system 12 through data bus 26.

As described above, the light detected by detector 16 is used to generate a "reference trigger signal" which will have rising edge transitions with a spacing in wavelength given by the formula:

$$\Delta\lambda_{fringe} = \lambda^2/2nL_{ref}$$

wherein $\lambda$ is the wavelength of the output of tunable laser 22, $L_{REF}$ is the length of optical fiber 42, and n is the index of refraction of the optical fiber 42. Typically, n is about 1.46. The measurement fringes from detector 18 are sampled at $2\pi$ increments of the fringes from the reference cavity.

The method of the present invention will now be discussed in detail. For purposes of the ensuing discussion, the components of the apparatus of the present invention will have the operational characteristics of the commercially available components discussed above. However, it is to be understood that other components having similar operational characteristics may be used to implement the method of the present invention. For example, laser 22 can be implemented by any coherent light source that has wavelength tuning capability.

The first step of the method of the present invention comprises setting the wavelength of tunable laser 22 to the beginning of the predetermined sweep range. To effects setting the wavelength of tunable laser 22, control system 12 outputs a command over data bus 23 which is inputted into the data input (the GPIB port) of laser controller 20. The command represents a predetermined initial position of the picomotor of laser controller 20.

The next step entails sweeping tunable laser 22 through a wavelength range that is determined by the tuning range of the PZT. The PZT of laser controller 20 has a tuning range of about 0.29 nm as discussed above. It is highly preferred that the PZT be swept over a range that is less than the maximum tuning range of the PZT in order to avoid distortion. Thus, the PZT is swept over a range of 0.23 nm. In order to accomplish this, control system 12 outputs a series of multi-bit signals over data bus 26 to DAQ circuit 14. These multi-bit signals are digital representations of analog voltages within a predetermined range. The voltage range depends upon the operational characteristics of laser controller 20. For example, if laser controller 20 has operational characteristics of the New Focus 6200 Controller discussed above, then a voltage range of −3 volts to +3 volts would be suitable to effect a sweep range of 0.23 nm. The multi-bit signals are inputted into the DAC of DAQ circuit 14 which converts the multi-bit signals into analog voltages within the predetermined range. The analog voltages are inputted into the PZT voltage input of laser controller 20.

As the wavelength of tunable laser 22 is swept over the range based on the PZT tuning range, the intensities of the reference interference fringes emanating from the reference cavity (described above) and the measurement interference fringes emanating from the sensing section (described above) are detected by detectors 16 and 18, respectively. FIG. 2 shows an example of a reference fringe at the input of detector 16 which results from one (1) wavelength sweep by the PZT. The horizontal axis in FIG. 2 is typically in the time domain. However, since the ADC of DAQ circuit 14 is sampling at even increments, the horizontal axis in FIG. 2 represents sample number n. The vertical axis in FIG. 2 represents power at the input to detector 16. The intensities of the reference and measurement interference fringes are converted to analog voltages as discussed above. The analog voltages from detector 18 are inputted into the ADC of DAQ circuit 14 which converts the analog voltages into respective digital representations of the intensities of the measurement interference fringe at the rising edge transitions of the reference trigger signal. These digital representations are transferred to control system 12 via data bus 26. Control system 12 creates arrays of these digital representations and the corresponding sample times or sample numbers, i.e. each digital representation has a corresponding sample number.

At the end of each sweep, control system 12 outputs a command over data bus 23 that is inputted into laser controller 20. This command advances the picomotor by 0.23 nm. The steps described above are then repeated. Control system 12 outputs another series of multi-bit signals for input into the DAC of DAQ circuit 14. In response, the DAQ circuit 14 outputs the same predetermined range of voltages discussed above (e.g. −3 v to +3 v) for input into the PZT input of laser controller 20. Tunable laser 22 is again swept over a 0.23 nm. The total number of sweeps determines the number of reference and measurement fringes that will be measured. The number of sweeps depends upon the desired bandwidth coverage. Thus, laser 22 is controlled to output optical radiation over one or more contiguous wavelength ranges or bands. For example, if it is necessary to vary the wavelength of tunable laser 22 by 2.3 nm, and the tuning range of the PZT is 0.23 nm, then ten (10) contiguous sweeps are needed. As a result, there will be ten (10) sets of reference interference fringe data and ten (10) sets of measurement interference fringe data.

An FFT is then performed on the values of the measurement interference fringe. Performing the FFT transfers the measurement fringe from the wavenumber domain to the spatial domain. As described above, the FFT of the linearized measurement fringe array is effected by control system 12 via execution of the appropriate software routine. FIG. 3 illustrates the transformation of three (3) sets of measurement interference fringe arrays, produced by sweeping three (3) contiguous wavelength ranges, from the wavenumber domain into the spatial domain. The X-axis associated with each waveform 74, 76 and 78 is distance along optical fiber 52 with respect to reflector 54. Waveforms 74, 76, and 78 represent the FFT of the aforementioned interference fringes. In a preferred embodiment, the point-to-point matching, linearization of sample points and the FFT is effected by control system 12 via execution of the appropriate software routine.

The next step entails summing the corresponding amplitudes of each of the waveforms 74, 76 and 78 to produce waveform 80. Control system 12, via the appropriate software routine, performs the aforementioned summing function. Waveform 80 allows location of each grating in space without respect to its wavelength. Waveform 80 is used only to identify the grating location and width for use in the next step of the method. Each grating location is with respect to reference reflector 54 (FIG. 1).

The next step of the method of the present invention entails extracting amplitudes, from waveforms 74, 76 and 78, that are associated with a particular grating. For purposes of describing this step, reference is made to vertical lines 82 and 84 of FIG. 3 which designate the values 86, 88 and 90 of waveforms 74, 76 and 78, respectively, that are to be extracted. The extracted values are Fourier Transformed by control system 12, back into the wavenumber domain. This transformation results in spectrum graphs 92, 94, 96. Each spectrum graph 92, 94, and 96 represents the spectrum of the selected Bragg grating over the three (3) contiguous wavelength ranges that are swept via laser controller 20 and tunable laser 22. Spectrum graphs 92, 94, and 96 may be concatenated to form composite spectrum graph 98 wherein portions 100, 102, 104 correspond to graphs 92, 94 and 96, respectively.

The next step is to analyze the shift in the spectrum (graph 98) of the selected grating. The strain on the grating at each wavelength of optical radiation is determined by determining the difference between the current wavelength and an earlier, zero-strain wavelength measurement. Although the discussion above pertains to a selected grating, it is to be understood that the steps above are implemented for all gratings. Thus, the strain at each grating in each Bragg grating 60 can be measured independently.

Referring again to FIG. 3, correlation waveforms 106, 108 and 110 result from interference of light reflected from two (2) Bragg gratings. Waveform 112 is the summation of correlation waveforms 106, 108 and 110. These correlation effects are actually the autocorrelation of Bragg gratings 60. Such correlation effects occur between zero and $L_S$. Thus, the use of optical fiber 56 (buffer) is highly preferred.

Further theoretical description of the present invention is found in M. Froggatt and J. Moore, "Distributed measurement of static strain in an optical fiber with multiple Bragg gratings at nominally equal wavelengths", Appl. Opt. 37, 1741–1746 (1998), herein incorporated by reference.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for measuring strain of gratings written in an optical fiber comprising the steps of:
   a) providing a reference optical fiber network having a reference optical fiber;
   b) transmitting optical radiation over one or more contiguous predetermined wavelength ranges into the reference optical fiber network and an optical fiber network under test, the optical fiber network under test including a reflector and a sensing optical fiber having a plurality of gratings written thereon, the transmission of optical radiation over each wavelength range into the reference optical fiber network and the optical fiber network under test producing a plurality of reference interference fringes and measurement interference fringes, respectively;
   c) detecting the reference and measurement interference fringes;
   d) sampling the measurement interference fringes as triggered by the reference interference fringes;
   e) transforming each sampled measurement interference fringe into a spatial domain waveform such that each spatial domain waveform corresponds to one of the contiguous predetermined wavelength ranges;

f) transforming each portion of the spatial domain waveform associated with a particular grating into a corresponding frequency spectrum representation; and g) determining the strain on the grating at each wavelength of optical radiation by determining the difference between the current wavelength and an earlier, zero-strain wavelength measurement.

2. The method according to claim 1 further comprising the step (h) of repeating steps (f)–(g) for every grating written on the sensing optical fiber.

3. The method according to claim 1 wherein step (f) further comprises concatenating each frequency spectrum representation to form a composite frequency spectrum representation.

4. The method according to claim 1 wherein transforming step (e) comprises the step of producing a discrete Fourier Transform based on the samples and sample numbers associated with the measurement interference fringes to produce the spatial domain waveforms.

5. An apparatus for measuring strain of gratings written in an optical fiber comprising:

a reference optical fiber network having a reference optical fiber;

a coherent light source for transmitting optical radiation over one or more contiguous predetermined wavelength ranges into the reference optical fiber network and an optical fiber network under test, the optical fiber network under test including a reflector and a sensing optical fiber having a plurality of gratings written thereon, the transmission of optical radiation over each wavelength range into the reference optical fiber network and the optical fiber network under test producing a plurality of reference interference fringes and measurement interference fringes, respectively;

a detector for detecting the reference and measurement interference fringes;

a control system for (i) sampling the measurement interference fringes as triggered by the reference interference fringes, (ii) transforming each sampled measurement interference fringe into a spatial domain waveform such that each spatial domain waveform corresponds to one of the contiguous predetermined wavelength ranges, (iii) transforming each portion of the spatial domain waveform associated with a particular grating into a frequency spectrum representation, and (iv) determining the strain on the grating at each wavelength of optical radiation by determining the difference between the current wavelength and an earlier, zero-strain wavelength measurement.

6. The apparatus according to claim 5 wherein the control system performs functions (i)–(iv) on each grating written into the sensing optical fiber.

7. The apparatus according to claim 5 wherein the control system comprises means for concatenating each frequency spectrum representation to form a composite frequency spectrum representation.

8. The apparatus according to claim 5 wherein the coherent light source comprises a tunable laser.

9. The apparatus according to claim 8 further comprising a laser controller for tuning the laser over each of the contiguous wavelength ranges.

10. An apparatus for measuring strain of gratings written in an optical fiber comprising:

a reference optical fiber network having a reference optical fiber;

means for transmitting optical radiation over one or more contiguous predetermined wavelength ranges into the reference optical fiber network and an optical fiber network under test, the optical fiber network under test including a reflector and a sensing optical fiber having a plurality of gratings written thereon, the transmission of optical radiation over each wavelength range into the reference optical fiber network and the optical fiber network under test producing a plurality of reference interference fringes and measurement reference interference fringes, respectively;

means for detecting the reference and measurement interference fringes;

means for sampling the measurement interference fringes as triggered by the reference interference fringes;

means for transforming each sampled measurement interference fringe into a spatial domain waveform such that each spatial domain waveform corresponds to one of the contiguous predetermined wavelength ranges;

means for transforming each portion of the spatial domain waveform associated with a particular grating into a corresponding frequency spectrum representation; and means for determining the strain on the grating at each wavelength of optical radiation by determining the difference between the current wavelength and an earlier, zero-strain wavelength measurement.

11. A method for measuring strain of gratings written in an optical fiber comprising the steps of:

a) providing a reference optical fiber network having a reference optical fiber;

b) transmitting optical radiation over one or more contiguous predetermined wavelength ranges into the reference optical fiber network and an optical fiber network under test, the optical fiber network under test including a reflector and a sensing optical fiber having a plurality of gratings written thereon, the transmission of optical radiation over each wavelength range into the reference optical fiber network and the optical fiber network under test producing a plurality of reference interference fringes and measurement interference fringes, respectively;

c) detecting the reference and measurement interference fringes;

d) sampling the measurement interference fringes as triggered by the reference interference fringes;

e) transforming each sampled measurement interference fringe into a spatial domain waveform such that each spatial domain waveform corresponds to one of the contiguous predetermined wavelength ranges;

f) summing the spatial domain waveforms to form a summation spatial domain waveform;

g) determining from the summation spatial domain waveform the location of each grating with respect to the reflector of the optical fiber network under test;

h) determining from each spatial domain waveform of transforming step (e) a portion of the spatial domain waveform corresponding to a particular grating;

i) transforming each portion determined in step (h) into a corresponding frequency spectrum representation; and j) determining the strain on the grating at each wavelength of optical radiation by determining the difference between the current wavelength and an earlier, zero-strain wavelength measurement.

12. The method according to claim 11 further comprising the step (k) of repeating steps (h)–(j) for every grating written on the sensing optical fiber.

13. The method according to claim 11 wherein step (i) further comprises concatenating each frequency spectrum representation to form a composite frequency spectrum representation.

14. The method according to claim 11 wherein transforming step (e) comprises the step of producing a discrete Fourier Transform based on the samples and sample numbers associated with the measurement interference fringes to produce the spatial domain waveforms.

15. An apparatus for measuring strain of gratings written in an optical fiber comprising:
- a reference optical fiber network having a reference optical fiber;
- a coherent light source for transmitting optical radiation over one or more contiguous predetermined wavelength ranges into the reference optical fiber network and an optical fiber network under test, the optical fiber network under test including a reflector and a sensing optical fiber having a plurality of gratings written thereon, the transmission of optical radiation over each wavelength range into the reference optical fiber network and the optical fiber network under test producing a plurality of reference interference fringes and measurement interference fringes, respectively;
- a detector for detecting the reference and measurement interference fringes; and
- a control system for (i) sampling the measurement interference fringes as triggered by the reference interference fringes, (ii) transforming each sampled measurement interference fringe into a spatial domain waveform such that each spatial domain waveform corresponds to one of the contiguous predetermined wavelength ranges, (iii) summing the spatial domain waveforms to form a summation spatial domain waveform, (iv) determining from the summation spatial domain waveform the location of each grating with respect to the reflector of the optical fiber network under test, (v) determining from each spatial domain waveform the portion of the spatial domain waveform corresponding to a particular grating, (vi) transforming each portion into a frequency spectrum representation, and (vii) determining the strain on the grating at each wavelength of optical radiation by determining the difference between the current wavelength and an earlier, zero-strain wavelength measurement.

16. The apparatus according to claim 15 wherein the control system performs functions (i)–(vii) on each grating written into the sensing optical fiber.

17. The apparatus according to claim 15 wherein the control system comprises means for concatenating each frequency spectrum representation to form a composite frequency spectrum representation.

18. The apparatus according to claim 15 wherein the coherent light source comprises a tunable laser.

19. The apparatus according to claim 18 further comprising a laser controller for tuning the laser over each of the contiguous wavelength ranges.

20. An apparatus for measuring strain of gratings written in an optical fiber comprising:
- a reference optical fiber network having a reference optical fiber;
- means for transmitting optical radiation over one or more contiguous predetermined wavelength ranges into the reference optical fiber network and an optical fiber network under test, the optical fiber network under test including a reflector and a sensing optical fiber having a plurality of gratings written thereon, the transmission of optical radiation over each wavelength range into the reference optical fiber network and the optical fiber network under test producing a plurality of reference interference fringes and measurement reference interference fringes, respectively;
- means for detecting the reference and measurement interference fringes;
- means for sampling the measurement interference fringes as triggered by the reference interference fringes;
- means for transforming each sampled measurement interference fringe into a spatial domain waveform such that each spatial domain waveform corresponds to one of the contiguous predetermined wavelength ranges;
- means for summing the spatial domain waveforms to form a summation spatial domain waveform;
- means for determining from the summation spatial domain waveform the location of each grating with respect to the reflector of the optical fiber network under test;
- means for determining from each spatial domain waveform a portion of the spatial domain waveform corresponding to a particular grating;
- means for transforming each determined portion into a corresponding frequency spectrum representation; and
- means for determining the grating at each wavelength of optical radiation by determining the difference between the current wavelength and an earlier, zero-strain wavelength measurement.

* * * * *